(12) United States Patent
Le-Ngoc et al.

(10) Patent No.: US 10,334,631 B2
(45) Date of Patent: Jun. 25, 2019

(54) SYSTEM AND METHOD FOR A CONFIGURABLE FRAME STRUCTURE

(71) Applicants: Tho Le-Ngoc, Montreal (CA); Atoosa Dalili Shoaei, Montreal (CA); Mohamed Adel Salem, Kanata (CA)

(72) Inventors: Tho Le-Ngoc, Montreal (CA); Atoosa Dalili Shoaei, Montreal (CA); Mohamed Adel Salem, Kanata (CA)

(73) Assignee: HUAWEI TECHNOLOGIES CANADA CO., LTD., Kanata, Ontario ( * ) Notice: Subject to any disclaimer, the term of this patent is extended or adjusted under 35 U.S.C. 154(b) by 288 days.

(21) Appl. No.: 15/166,901

(22) Filed: May 27, 2016

(65) Prior Publication Data

US 2017/0347378 A1 Nov. 30, 2017

(51) Int. Cl.
*H04W 74/08* (2009.01)
*H04W 72/04* (2009.01)
*H04W 74/06* (2009.01)

(52) U.S. Cl.
CPC ..... *H04W 74/0833* (2013.01); *H04W 72/042* (2013.01); *H04W 72/0446* (2013.01); *H04W 74/06* (2013.01)

(58) Field of Classification Search
CPC ............. H04W 16/14; H04W 72/0446; H04W 72/0413
See application file for complete search history.

(56) References Cited

U.S. PATENT DOCUMENTS

| 6,411,613 B1 * | 6/2002 | Seymour ............... H04B 7/2659 370/347 |
| 6,697,346 B1 | 2/2004 | Halton et al. |
| 9,496,997 B2 * | 11/2016 | Park ....................... H04B 7/024 |
| 9,609,499 B2 * | 3/2017 | Shukla ..................... H04W 4/22 |
| 2004/0146019 A1 * | 7/2004 | Kim ..................... H04W 74/002 370/329 |
| 2009/0103501 A1 | 4/2009 | Farrag et al. |

(Continued)

FOREIGN PATENT DOCUMENTS

WO 2014021990 A1 2/2014

OTHER PUBLICATIONS

"Resource Allocation for D2D Communication", CATT-3GPP TSG RAN WG1 Meeting #75, R1-135094, Guangzhou, China, Oct. 7-11, 2013, pp. 1-4.

(Continued)

*Primary Examiner* — Tejis Daya

(57) ABSTRACT

System and methods are disclosed in which an uplink frame is configured to accommodate each, some, or all of the following types of access: (1) demand assigned access in which a UE requests resources and is then granted a partition of resources of the uplink frame; (2) free assigned access in which one or more UEs are granted a partition of resources of the uplink frame without UEs requesting the grant of the resources; and (3) random access in which a partition of resources of the frame are used by UEs for random access communication. The frame may be configurable on a semi-static or dynamic basis. In this way, the base station may be able to better accommodate UEs having different traffic characteristics and/or different latency requirements.

14 Claims, 8 Drawing Sheets

(56) References Cited

U.S. PATENT DOCUMENTS

| | | | |
|---|---|---|---|
| 2009/0180459 A1* | 7/2009 | Orlik | H04L 5/0007 370/344 |
| 2009/0185632 A1* | 7/2009 | Cai | H04L 5/0044 375/260 |
| 2010/0113051 A1* | 5/2010 | Du | H04W 74/002 455/450 |
| 2010/0135176 A1* | 6/2010 | Kazmi | H04W 24/08 370/252 |
| 2010/0309910 A1* | 12/2010 | Fitch | H04B 7/18584 370/389 |
| 2011/0007720 A1* | 1/2011 | Shimizu | H04W 74/02 370/336 |
| 2011/0222472 A1* | 9/2011 | Breit | H04B 7/0626 370/328 |
| 2013/0051358 A1* | 2/2013 | Turtinen | H04W 74/0816 370/330 |
| 2013/0170479 A1* | 7/2013 | Fong | H04W 74/085 370/336 |
| 2013/0301541 A1 | 11/2013 | Mukherjee et al. | |
| 2014/0079011 A1* | 3/2014 | Wiberg | H04W 74/006 370/329 |
| 2015/0009943 A1 | 1/2015 | Zhang et al. | |
| 2015/0264132 A1* | 9/2015 | Dang | H04L 51/38 709/206 |
| 2016/0007379 A1* | 1/2016 | Seok | H04W 74/085 370/338 |
| 2016/0359653 A1* | 12/2016 | Lee | H04L 27/2613 |

OTHER PUBLICATIONS

Hac et al., "Demand Assignment Multiple Access Protocols for Wireless ATM Networks", Vehicular Technology Conference, 2000, IEEE-VTS Fall VTC 2000, 52nd, Sep. 24-28, 2000, pp. 237-241.

Maeder et al., "Group-based Allocation of Random Access Resources", IEEE C802.16p-11/0034r1, IEEE 802.16 Broadband Wireless Access Working Group, Jun. 3, 2011, pp. 1-4.

Le-Ngoc, Tho et al., Performance of Combined Free/Demand Assignment Multiple-Access Schemes in Satellite Communications, International Journal of Satellite Communications, vol. 14, 11-21, (1996), pp. 11-21.

Le-Ngoc, Tho et al., Performance Analysis of CFDAMA-PB Protocol for Packet Satellite Communications, IEEE Transactions on Communications, vol. 46, No. 9, Sep. 1998, pp. 1206-1214.

Le-Ngoc, Tho et al., Interactive Multimedia Satellite Access Communications, IEEE Communications Magazine, Jul. 2003, pp. 78-85.

* cited by examiner

SYSTEM AND METHOD FOR A CONFIGURABLE FRAME STRUCTURE

FIELD

The present application relates to a configurable frame structure for wireless communications.

BACKGROUND

In some wireless communication systems, a user equipment (UE) wirelessly communicates with a base station. A wireless communication from the UE to the base station is referred to as an uplink communication. A wireless communication from the base station to the UE is referred to as a downlink communication. Resources are required to perform uplink and downlink communications. For example, a UE may wirelessly transmit data to a base station in an uplink communication at a particular frequency during a particular time slot. The frequency and time slot used are examples of resources.

An uplink frame is a set of time/frequency resources allocated for uplink communications from UEs to a base station. One example of an uplink frame is an uplink orthogonal frequency-division multiple access (OFDMA) frame.

In some wireless communication systems, if a UE wants to transmit data to the base station, a demand assignment is performed, as follows. The UE first sends a message, to the base station, requesting uplink resources. The base station responds to the request by scheduling the UE on some time/frequency resources of an uplink frame. The base station sends a message to the UE indicating the time/frequency resources on which the UE has been scheduled. The UE then sends the uplink transmission using the time/frequency resources. The time/frequency resources may be referred to as a resource block.

Multiple access occurs when more than one UE is scheduled on the same uplink frame. Each UE uses a different dedicated group of time/frequency resources of the uplink frame to transmit data to the base station. The base station decides, on a frame-by-frame basis, which UEs will be scheduled on which resources of the uplink frame. A UE may be granted resources in one uplink frame, but not in another uplink frame.

Multiple access using demand assignment is referred to as demand assignment multiple access. Demand assignment multiple access may not be desirable for all UEs being served by a base station. For example, a particular UE may have bursty traffic that needs to be transmitted to the base station with low latency. The delay incurred by a demand assignment procedure may introduce an unacceptable amount of latency for some traffic types or applications.

SUMMARY

System and methods are disclosed in which an uplink frame is configured to accommodate each, some, or all of the following types of access: (1) demand assigned access in which a UE requests resources and is then granted a partition of resources of the uplink frame; (2) free assigned access in which one or more UEs are granted a partition of resources of the uplink frame without the UEs requesting the grant of the resources; and (3) random access in which a partition of resources of the frame are used by UEs for random access communication.

In some embodiments, the frame may be configurable on a semi-static or dynamic basis in order to modify which resources are allocated to demand assigned, free assigned, and random access. The base station may therefore be able to better accommodate UEs having different or changing traffic characteristics.

In one embodiment, a method performed by a base station is disclosed. The method includes transmitting at least one message allocating resources of an uplink frame. The at least one message allocates a first partition of resources of the uplink frame as demand assigned resources. The demand assigned resources are allocated to a first UE in response to a request for uplink resources. The at least one message also allocates a second partition of resources of the uplink frame as free assigned resources. The free assigned resources are allocated to a second UE, not in response to a request for uplink resources. The at least one message also allocates a third partition of resources of the uplink frame as random access resources. The random access resources are allocated for shared use by both a third UE and a fourth UE, for random access uplink communication.

In another embodiment, a base station is disclosed. The base station includes a frame configuration module that is configured to generate the message allocating the resources. The base station further includes at least one antenna for transmitting the message.

In another embodiment, a method performed by a UE is disclosed. The method includes receiving at least one message from a base station. The at least one message allocates resources in an uplink frame to the UE. The method further includes performing medium sensing during a backoff duration to determine whether, any time during the backoff duration, another UE begins sending an uplink transmission using the resources. The method further includes sending an uplink transmission using the resources upon completion of the backoff duration when the UE determines that, during the backoff duration, there is not another UE that begins sending an uplink transmission using the resources.

In another embodiment, a UE is disclosed that includes a resource determination module to determine, from at least one message, the resources in the uplink frame that have been allocated to the UE. The UE further includes a listen-before-talk (LBT) module to perform the medium sensing. The UE further includes at least one antenna to send an uplink transmission using the resources upon completion of the backoff duration.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
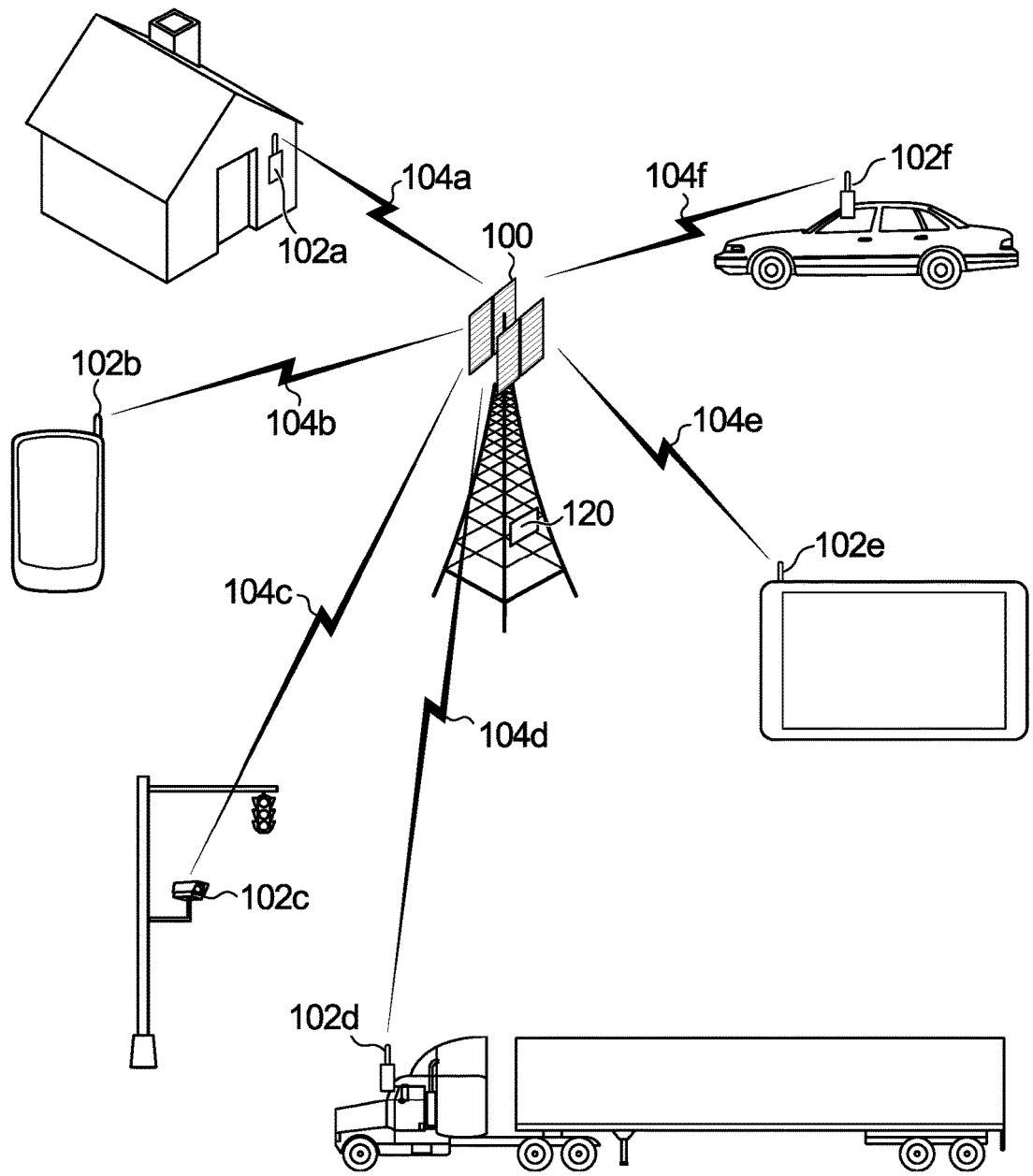
FIG. 1 is a block diagram of a base station and a plurality of UEs, according to one embodiment.

FIG. 1 is a block diagram of a base station 100 and a plurality of UEs 102a-f (individually or collectively 102), according to one embodiment. Only six UEs are illustrated in FIG. 1, but there may be more UEs. Also, different types of UEs are illustrated in FIG. 1 to indicate that the UEs may be different types of devices. UE 102a is a utility meter on the side of a house. UE 102b is a mobile phone. UE 102c is a camera for photographing traffic at an intersection. UE 102d is a transmitter on an autonomous truck. UE 102e is a tablet. UE 102f is a transmitter on an autonomous car.

Although UEs 102a-f are different devices, what is common to all of UEs 102a -f is that each UE 102a-f sometimes has data to transmit to the base station 100. Each one of data transmissions 104a-f is an uplink transmission of data to base station 100 from a respective one of UEs 102a-f. Sometimes all of the UEs 102a-f have data to transmit to the base station 100 at the same time. Other times, none or only a subset of the UEs 102a-f have data to transmit to the base station 100.

he uplink data traffic characteristics of each of UEs 102a-f may be different. For example, UE 102a may only need to transmit data to the base station 100 once every minute, and the amount of data transmitted by UE 102a every minute may be capped or fixed at a size known to the base station 100. The uplink data traffic characteristics of UE 102b and UE 102e may vary depending upon the actions performed by the persons operating UE 102b and UE 102e. UE 102c may only need to transmit data to the base station 100 once every ten seconds. UE 102d and UE 102f may each transmit bursty traffic having a low latency requirement due to the nature of autonomous driving.

Data is transmitted from the UEs 102a-f to the base station 100 in uplink frames. Each uplink frame is a set of time/frequency resources allocated to one or more of the UEs 102a-f for uplink communications to the base station 100.

A frame configuration module 120 of the base station 100 partitions each uplink frame into three resource types: demand assigned resources, free assigned resources, and random access resources. One or more of UEs 102a-f then use resources from one of the resource types to send an uplink transmission. Demand assigned resources are resources that are allocated to one or more UEs using demand assignment, i.e., resources allocated to one or more UEs in response to the one or more UEs requesting the uplink resources. Free assigned resources are resources that are allocated to one or more UEs without the one or more UEs specifically requesting the resources. Random access resources are resources that are allocated to a plurality of UEs so that the plurality of UEs may perform random access uplink communication. Free assigned resources and random access resources are both resources that are allocated to UEs without the UEs specifically requesting the resources. However, when free assigned resources are allocated to a particular UE, the particular UE may not need to perform medium sensing for a backoff duration before transmitting using the resources. Alternatively, the particular UE may need to perform medium sensing for a backoff duration before transmitting using the resources, but the backoff duration is not randomly chosen by the particular UE. Instead, the backoff duration is determined by the base station 100. On the other hand, when random access resources are allocated to a particular UE, the particular UE has a backoff duration that is randomized by the particular UE, i.e., the backoff duration is randomly chosen by the particular UE or the backoff duration has a component that is randomly chosen by the particular UE.

Figure 2:
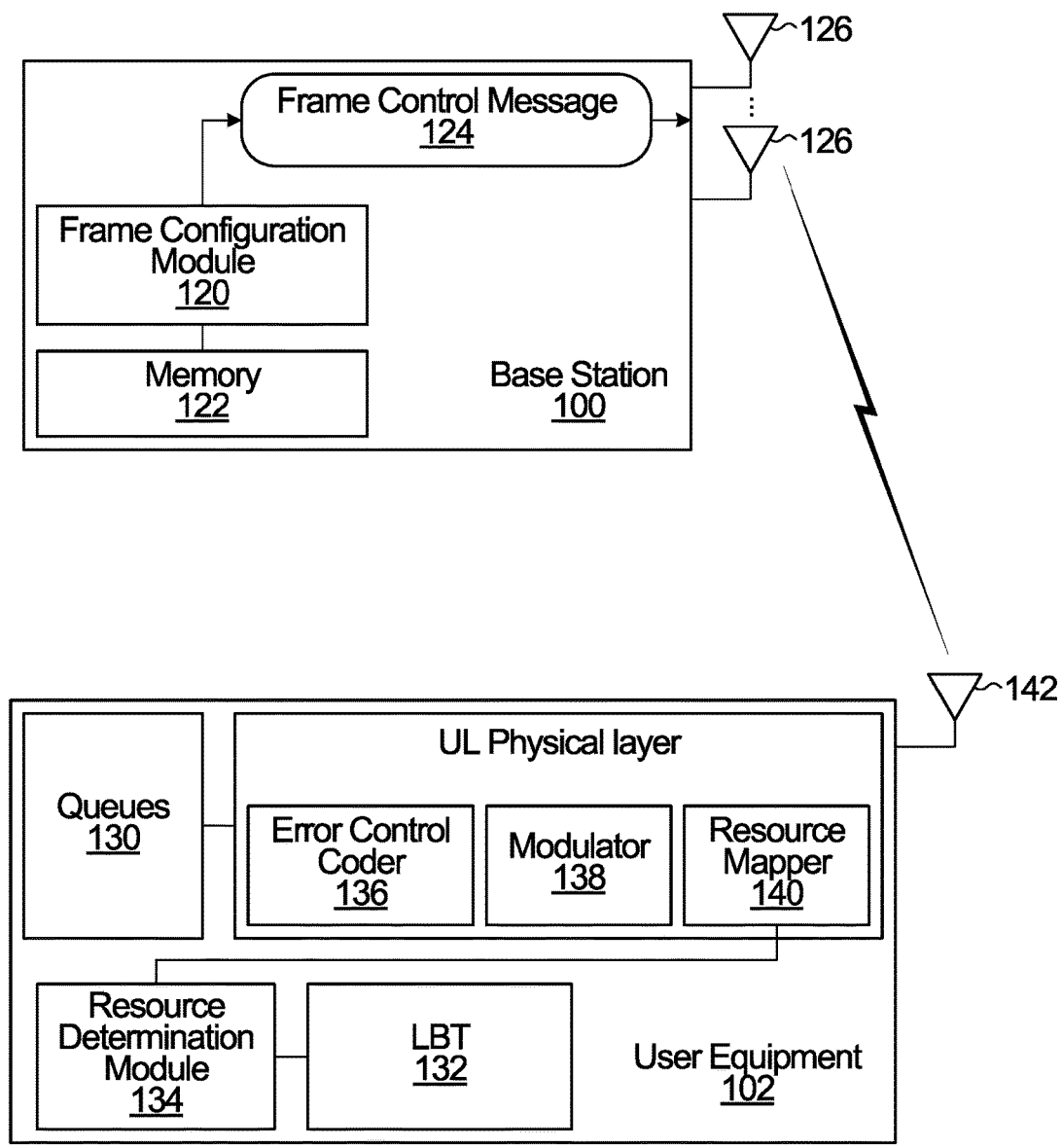
FIG. 2 is a block diagram of the base station and one UE of the plurality of UEs, according to one embodiment.

FIG. 2 is a block diagram of the base station 100 and UE 102 showing more detail, according to one embodiment. The base station 100 includes the frame configuration module 120 coupled to a memory 122. The frame configuration module 120 configures an uplink frame by determining which resources of the uplink frame will be allocated as demand assigned resources, free assigned resources, and random access resources. The frame configuration module 120 also determines which ones of UEs 102a-f will be allocated the demand assigned resources, the free assigned resources, and the random access resources. The frame configuration module 120 may perform other operations, as described below. The output of the frame configuration module 120 is a frame control message 124 associated with the uplink frame. The frame control message 124 is sent to UE 102 using antennas 126 of the base station 100. Multiple antennas 126 are illustrated in FIG. 2, but alternatively there may only be one antenna.

The frame configuration module 120 may be implemented by one or more processors (not illustrated) that execute instructions that cause the one or more processors to perform the operations of the frame configuration module 120. Alternatively, the frame configuration module 120 may be implemented using dedicated integrated circuitry (not illustrated), such as an application specific integrated circuit (ASIC), a graphics processing unit (GPU), or a programmed field programmable gate array (FPGA) for performing the operations of the frame configuration module 120.

The base station 100 is any device that wirelessly receives data in the uplink from UEs 102a-f. Therefore, in some implementations, the base station 100 may be called other names, such as a base transceiver station, a radio base station, a network node, an access point, a transmit node, a Node B, an eNode B, a relay station, a remote radio head, a transmit point, or a transmit and receive point. Also, in some embodiments, the components of the base station 100 are distributed. For example, the frame configuration module 120 may be located remote from equipment housing the antennas 126. Modules of the base station 100 may be coupled to the equipment housing the antennas 126 over a communication link (not illustrated). Also, only a few components of the base station 100 are illustrated in FIG. 2. The base station 100 may include other components for operation, e.g. to implement the physical layer, but these have been omitted for the sake of clarity.

UE 102 includes queues 130 for storing data to be transmitted to the base station 100. In some embodiments, there may only be one queue. UE 102 further includes a listen-before-talk (LBT) module 132 for performing medium sensing. The medium sensing may be carrier sensing and/or medium sensing based on energy detection. In some embodiments, UE 102 does not or cannot perform medium sensing, in which case LBT module 132 is not present or is not used. UE 102 further includes a resource determination module 134 for processing the frame control message 124 from the base station 100. For example, the resource determination module 134 may parse the received frame control message 124 to determine what resources in the uplink frame can be used by UE 102 for transmitting data to the base station 100, and to determine whether UE 102 must first wait until completion of a backoff duration before sending the uplink transmission. UE 102 further includes modules for implementing the uplink physical layer, such as an error control coder 136, a modulator 138, and a resource mapper 140. UE 102 further includes one or more antennas 142 for transmitting data to the base station 100.

The queues 130 may be implemented by physical registers or memory. The LBT module 132, resource determination module 134, error control coder 136, modulator 138, and resource mapper 140 may each be implemented using a processor (not illustrated) that executes instructions to cause the processor to perform the respective operations of the LBT module 132, resource determination module 134, error control coder 136, modulator 138, and resource mapper 140. The same processor or different processors may be used to implement each component. Alternatively, the LBT module 132, resource determination module 134, error control coder 136, modulator 138, and resource mapper 140 may each be dedicated integrated circuity (not illustrated), such as an ASIC, a GPU, or an FPGA for performing the respective operations of the LBT module 132, resource determination module 134, error control coder 136, modulator 138, and resource mapper 140. One set of integrated circuity may be dedicated to implementing each of the LBT module 132, resource determination module 134, error control coder 136, modulator 138, and resource mapper 140. Alternatively, different integrated circuitry may be used to implement one or some of the LBT module 132, resource determination module 134, error control coder 136, modulator 138, and resource mapper 140.

UE 102 includes other components for operation, e.g. to implement the physical layer, but these have been omitted for the sake of clarity.

Figure 3:
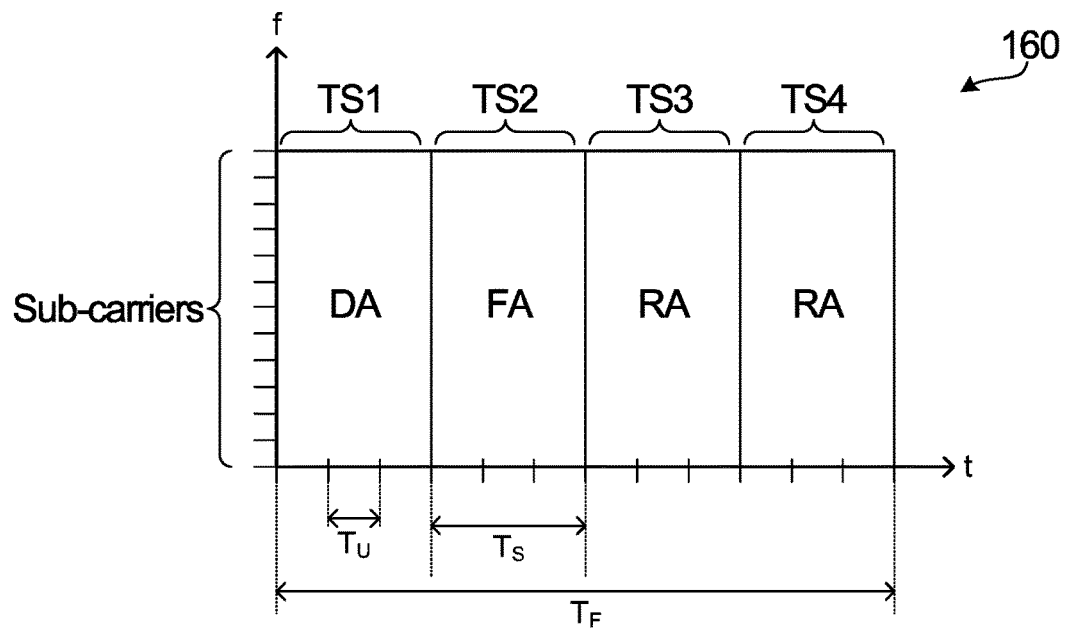
FIG. 3 illustrates a partitioned uplink frame, according to one embodiment.

In operation, the frame configuration module 120 of the base station 100 partitions a frame of uplink resources into demand assigned resources, free assigned resources, and/or random access resources. FIG. 3 illustrates an uplink frame 160 partitioned by the frame configuration module 120, according to one embodiment. The uplink frame 160 has a duration of $T_F$ milliseconds. Over the duration of the frame there are four time slots, labelled TS 1, TS 2, TS 3, and TS 4. Each time slot is of duration $T_S$. Each time slot consists of three atomic time units. Each time unit has a duration of $T_U$ milliseconds. A time unit may be a symbol period. In actual implementation, the number of time slots and/or the number of time units per time slot may be much larger, and the duration of each time slot does not have to be the same. In the frequency domain, a plurality of OFDM frequency sub-carriers are available at each time unit.

The frame configuration module 120 partitions the uplink frame 160 into the three resource types by designating all of time slot 1 as demand assigned (DA) resources, by designating all of time slot 2 as free assigned (FA) resources, and by designating each of time slots 3 and 4 as random access (RA) resources. A time slot that is allocated as demand assigned resources may be referred to as a D-slot. A time slot that is allocated as free assigned resources may be referred to as an F-slot. A time slot that is allocated as random access resources may be referred to as an R-slot. Different partitions of time/frequency resources in the uplink frame 160 are at different locations in the uplink frame 160. For example, the demand assigned resources are at a location in the uplink frame 160 that is different from the location of the free assigned resources in the uplink frame 160.

Figure 4:
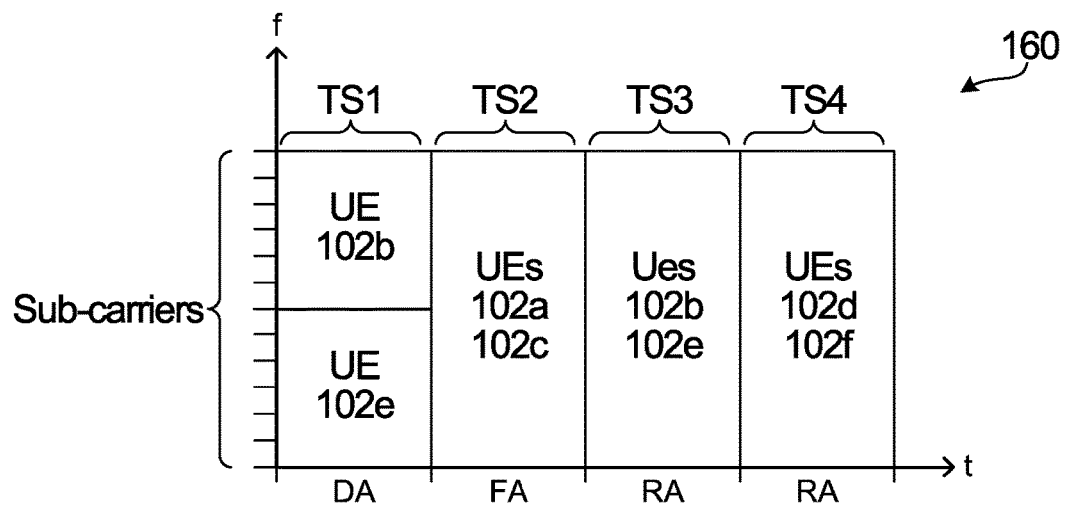
FIG. 4 illustrates the uplink frame of FIG. 3, allocated to UEs according to one embodiment.

The frame configuration module 120 determines which ones of UEs 102a-f are allocated the demand assigned resources, which ones of UEs 102a-f are allocated the free assigned resources, and which ones of UEs 102a-f are allocated the random access resources. FIG. 4 illustrates the uplink frame 160, allocated to UEs 102a-f, according to one embodiment. UEs 102b and 102e are both allocated respective dedicated resources of the demand assigned resources. UEs 102a and 102c are both allocated the free assigned resources. However, the free assigned resources are shared by UEs 102a and 102c. The random access resources in time slot 3 are allocated to UEs 102b and 102e for random access uplink communication. The random access resources in time slot 4 are allocated to UEs 102d and 102f for random access uplink communication.

Returning to FIG. 2, the frame configuration module 120 generates the frame control message 124 indicating, to each of the UEs served by the base station, which resources are allocated to the UE. The frame control message 124 is then transmitted to the UEs using antennas 126.

In one embodiment, a single frame control message 124 for the uplink frame 160 is broadcast to all of UEs 102a-f, and a respective portion of the frame control message 124 is dedicated to each respective UE 102a-f. Alternatively, an individual frame control message 124 may be unicast to each of UEs 102a-f via a downlink unicast transmission from the base station 100.

The UE 102 receives the frame control message 124 transmitted from the base station 100. The resource determination module 134 parses the frame control message 124 to determine which resources of the uplink frame are allocated to UE 102. The exact information provided to UE 102 in the frame control message 124 is implementation specific. Also, the specific information provided in the frame control message 124 may depend upon whether UE 102 has been allocated demand assigned resources, free assigned resources, or random access resources. However, an example will be provided, as follows. UE 102 may have data stored in the queues 130 that is to be transmitted to the base station 100, and UE 102 may have previously sent an uplink transmission requesting uplink resources for transmitting the data. The frame control message 124 may therefore indicate to UE 102 which demand assigned resources have been allocated to UE 102 for transmitting the data in the queues 130. The resource determination module 134 indicates, to the resource mapper 140 of the uplink physical layer, the resources that have been allocated to UE 102. The data from the queues 130 is then error control coded by the error control coder 136 and modulated by modulator 138 to result in symbols. The symbols are then mapped by the resource mapper 140 to the resources in the uplink frame allocated to UE 102. The symbols are then transmitted using the resources via the antenna 142.

In one embodiment, the portion of resources allocated as demand assigned resources may be determined by the frame configuration module 120 according to how many uplink resources have been requested by UEs 102a-f. For example, if no UEs 102a-f have requested uplink resources, then the frame configuration module 120 may not allocate any demand assigned resources in the uplink frame. On the other hand, if UEs 102b and 102e have each requested uplink resources, then the frame configuration module 120 may allocate a portion of the uplink frame as demand assigned resources, and then allocate a first partition of the demand assigned resources to UE 102b and a second partition of the demand assigned resources to UE 102e. The amount of demand assigned resources allocated to UE 102b and UE 102e may depend upon how much data UE 102b and UE 102e have to transmit to the base station 100. In some embodiments, each uplink frame may have a maximum partition of resources that is able to be allocated as demand assigned resources, regardless of the number of UEs actually requesting uplink resources.

The frame configuration module 120 may use rules stored in the memory 122 to determine whether or not an uplink frame includes free assigned resources, and how the free assigned resources are allocated to UEs. The rules are determined based on the known or learned behaviour of UEs served by the base station 100. For example, UE 102a is a utility meter that has the following data traffic characteristic: UE 102a transmits data to the base station 100 once every minute, and the amount of data transmitted to the base station 100 by UE 102a is capped or fixed. The frame configuration module 120 may be informed of the data traffic characteristic of UE 102a when UE 102a is initialized, e.g. via a message sent from UE 102a to the base station 100. Alternatively, the frame configuration module 120 may monitor the uplink transmissions of UE 102a to learn the data traffic characteristic. In any case, once the data traffic characteristic of UE 102a is known by the frame configuration module 120, a corresponding rule is then stored in the memory 122. As an example, the rule may indicate that every minute uplink frame resources must be allocated to UE 102a until UE 102a has made the expected uplink transmission. The frame configuration module 120 then allocates free assigned resources to UE 102a according to the rule. The frame control message 124 indicates to UE 102a when and which free assigned resources are allocated to UE 102a. A similar rule may exist for UE 102c because UE 102c is a traffic camera that transmits data to the base station 100 on a periodic basis.

The frame configuration module 120 may determine how many resources, if any, are allocated as random access resources in an uplink frame based on how many UEs being served by the base station 100 require grant-free transmissions. For example, UEs 102d and 102f are autonomous vehicles that have the following data traffic characteristic: data to be transmitted to the base station 100 is of a bursty nature and has a low latency requirement. It would take an unacceptably long time for UEs 102d and 102f to first request uplink resources and be allocated dedicated demand assigned resources. Therefore, every uplink frame may have a partition of resources allocated as random access resources and allocated to UEs 102d and 102f, so that UEs 102d and 102f may have access to shared resources in each uplink frame in order to send any data that has arrived at UEs 102d and 102f. The frame control message 124 indicates, to UEs 102d and 102f, the random access resources in each uplink frame that have been allocated to UEs 102d and 102f.

Figure 5:
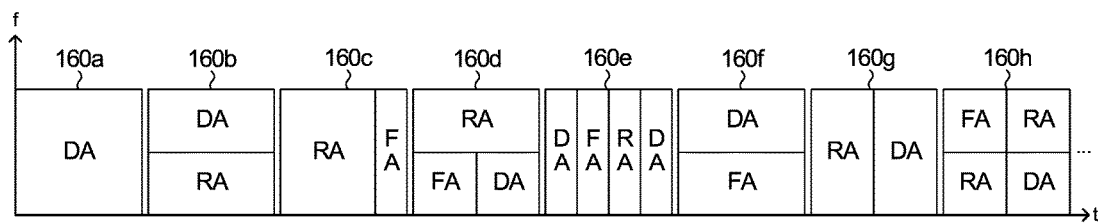
FIG. 5 illustrates one example way in which a plurality of uplink frames may be partitioned into different resource types.

The way in which resources are allocated in each uplink frame may vary from frame to frame. FIG. 5 illustrates one example way in which a plurality of uplink frames may be partitioned into different resource types by the frame configuration module 120. All of the resources in frame 160a are allocated as demand assigned resources. Frames 160b and 160g include demand assigned resources and random access resources, but allocated in different ways. Frame 160c includes random access and free assigned resources. Frames 160d, 160e, and 160h include all three types of resources, but allocated in different ways. Frame 160f includes demand assigned resources and free assigned resources. In FIG. 5, the resource allocation changes dynamically every frame. Alternatively, the resource allocation may be static or semi-static. For example, the resource allocation may only change every four frames. Also, in FIG. 5, some of the resources are partitioned in the frequency domain. For example, in frame 160b, half of the frequencies are allotted as demand assigned resources for the whole frame, and the other half of the frequencies are allotted as random access resources for the whole frame. Partitioning the resources in the frequency domain, e.g. as in frame 160b, may not be possible in some wireless communication systems. Also, in FIG. 5, the duration of each frame is the same. More generally, the frame duration may change dynamically or semi-statically. The frame control message 124 may be used to indicate the frame duration.

The frame configuration described herein may be used in a time division duplex (TDD) system, a frequency division duplex (FDD) system, or a full duplex (FD) system. In a TDD system, both uplink communications and downlink communications share the same frequency band. Therefore, the uplink frames, configured as described herein, may instead be subframes. The uplink subframes may be separated in time by one or more downlink subframes. In TDD, a UE may implement medium sensing by monitoring or listening to the frequencies on which the UE will transmit. If the UE is sharing resources in an uplink frame with other UEs, medium sensing enables the UE to determine whether another uplink transmission is already using the resources before the UE begins its uplink transmission. However, a UE in a TDD system may not be able to detect a collision because the UE is in transmit mode when transmitting, not in receive mode. In a TDD system, if the UE is to send an uplink transmission using free assigned or random access resources, the UE may first perform medium sensing, but the base station may need to detect and announce if there is a collision.

In a FDD system, one frequency band is used for uplink communications, and another frequency band is used for downlink communications. Therefore, uplink frames may be adjacent to each other in time, e.g. as in FIG. 5. Downlink frames may be sent from the base station to the UE at the same time on the downlink frequency band. In FDD, a UE typically cannot implement medium sensing because the UE typically cannot monitor the frequencies on which the UE transmits, and so the UE cannot determine whether another transmission, using the frequencies, is already occurring. Therefore, in some embodiments, if the wireless communication system is a FDD system, when the base station allocates a particular frequency as a free assigned resource, the base station only allocates the particular frequency to one UE to avoid the need for medium sensing. If a group of UEs are granted the use of random access resources, then there may not be any carrier sensing to help mitigate collisions. Additionally, the base station will typically need to detect and announce if there is a collision.

In a FD system, the same resources are used for uplink and downlink communications. Therefore, an uplink frame, as configured herein, may use the same time and frequency resources as a downlink frame. In FD, a UE may implement medium sensing by monitoring the frequencies on which the UE will transmit. A UE may also be able to detect if there is a collision. However, it may be the case that not all UEs in a FD system have FD capability, e.g. one or more of the UEs may only have half-duplex capability. Therefore, some UEs in a FD system may not be able to perform medium sensing.

The frame configuration described herein may be used in a wireless communication system that is synchronous or asynchronous. A synchronous system means that neighboring base stations are synchronized to a common clock, and so uplink frames for different base stations may be synchronized. A wireless communication system implementing long-term evolution (LTE) is synchronous. An asynchronous system means that neighboring base stations are not synchronized to a common clock. A wireless communication system implementing Wi-Fi is an asynchronous system. The frame configuration described herein may support both LTE and Wi-Fi.

Depending upon whether the wireless communication system is TDD, FDD, or FD, UEs 102a-f may have the capability to perform medium sensing. If medium sensing capability is present, then the frame configuration module 120 may allocate the same shared resources to multiple UEs and prioritize which UEs have access to the allocated shared resources. The priority may be enforced by the UEs using medium sensing, as explained below.

In one embodiment, a group of UEs is allocated a partition of free assigned resources in an uplink frame. Each member of the group is also assigned, by the frame configuration module 120, a respective backoff duration. Each member of the group then uses medium sensing to monitor the partition of free assigned resources. The partition of free assigned resources may begin at the start of a time slot, in which case the medium sensing begins at the start of that time slot and ends upon completion of the backoff duration. The completion of the backoff duration may occur at an instance in time after the beginning of the time slot, but before the end of that time slot. If another UE begins transmitting using the partition of free assigned resources, during a monitoring UE's backoff duration, then the monitoring UE does not transmit using the resources. However, if upon completion of the monitoring UE's backoff duration, another UE still has not begun transmitting using the partition of free assigned resources, i.e. the channel is idle, then the monitoring UE sends its uplink transmission using the partition of free assigned resources.

For example, rules stored in the memory 122 of the base station 100 may indicate to the frame configuration module 120 that it is approximately the time that UEs 102a and 102c are expected to send an uplink transmission of data. In this example, the frame configuration module 120 is not aware of the exact time UEs 102a and UE 102c will each want to send an uplink transmission of data. Based on the rules, the frame control module 124 determines that the uplink transmission from each of UEs 102a and UE 102c are expected to be within the next second. Therefore, for the next uplink frame, the frame configuration module 120 allocates a partition of free assigned resources to both UE 102a and UE 102c. The frame configuration module 124 also assigns UE 102c a first backoff duration $T_1$, and assigns UE 102a a second backoff duration $T_2$. The first backoff duration $T_1$ is shorter than the second backoff duration $T_2$ because in this example UE 102c has transmission priority over UE 102a. The frame control message 124 indicates to UE 102a and UE 102c the partition of free assigned resources that has been allocated to UE 102a and UE 102c, as well as the respective backoff durations $T_1$ and $T_2$.

Figure 6:
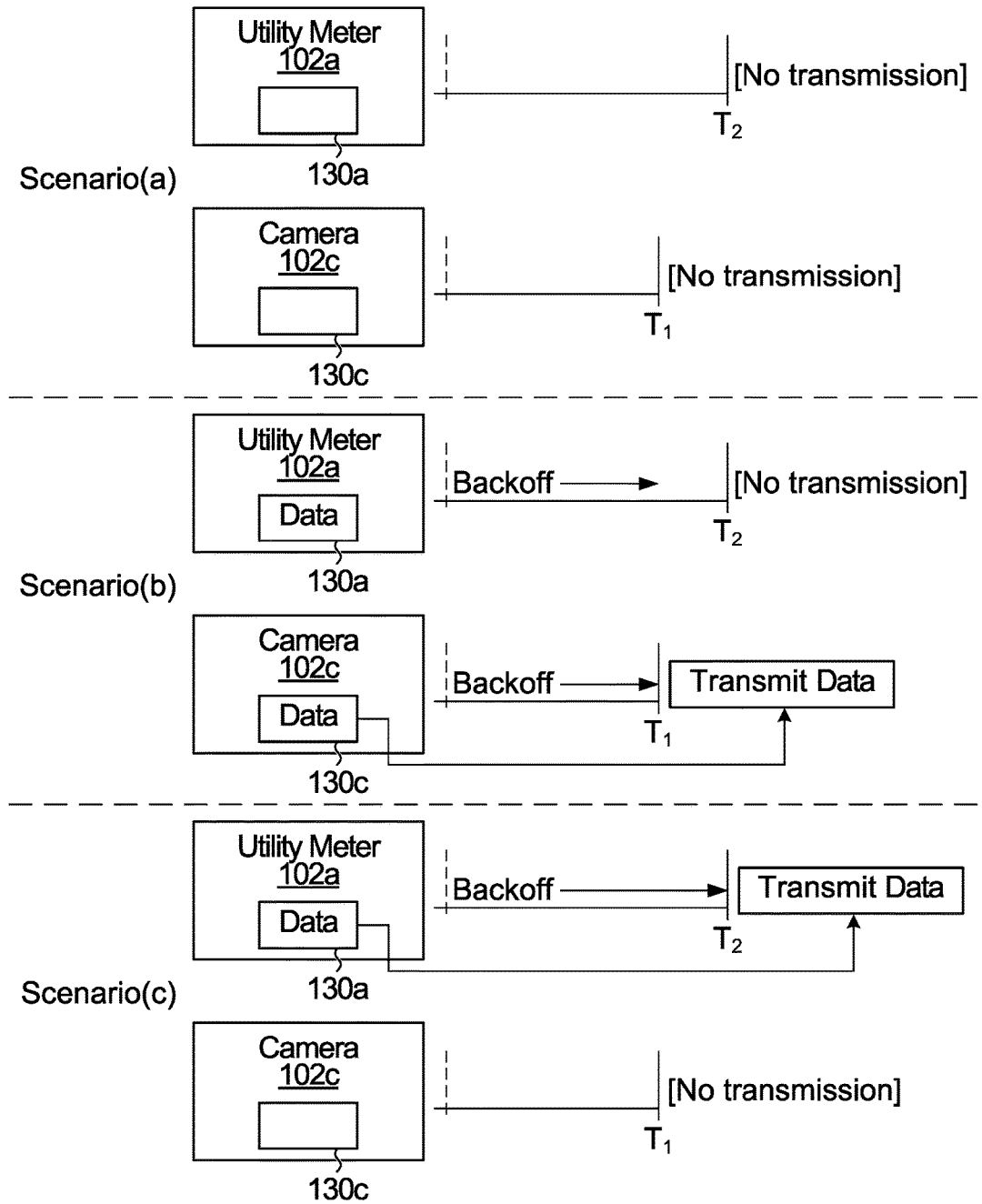
FIG. 6 illustrates three example uplink transmission scenarios for two UEs.

FIG. 6 illustrates three example uplink transmission scenarios for UEs 102a and 102c. The three transmission scenarios are labelled (a), (b), and (c). In scenario (a), neither UE 102a nor UE 102c has data that needs to be transmitted to the base station 100. The absence of data at UE 102a and UE 102c is indicated in FIG. 6 by showing an empty queue 130a associated with UE 102a and an empty queue 130c associated with UE 102c. Therefore, in scenario (a) there is no transmission. The frame configuration module 120 may continue to allocate a partition of free assigned resources to UE 102a and UE 102c in subsequent uplink frames. In scenario (b), UE 102a and UE 102c both have data to transmit to the base station 100. Both UE 102a and UE 102c begin monitoring the partition of free assigned resources to determine whether another UE is sending an uplink transmission using the partition of free assigned resources. The other UE may be another higher-priority UE (not illustrated) that is also assigned to the partition of free assigned resources. UE 102c backs off by monitoring until the completion of backoff duration $T_1$, and at that time the partition of free assigned resources is still unoccupied because no other UE transmission is occurring using the resources. UE 102c therefore begins sending its uplink transmission to the base station 100. UE 102a also backs off by monitoring during its backoff duration $T_2$, but shortly after the completion of backoff duration $T_1$ UE 102a determines that another UE 102c is already sending an uplink transmission using the allocated resources. UE 102a therefore does not send an uplink transmission using the partition of free assigned resources. UE 102a waits until a subsequent uplink frame to transmit its data. In scenario (c), UE 102a has data to transmit to the base station 100, but UE 102c does not have data to transmit to the base station 100. UE 102a backs off by monitoring the partition of free assigned resources for backoff duration $T_2$, to determine whether another UE is sending an uplink transmission using the partition of free assigned resources. Upon completion of backoff duration $T_2$, the partition of free assigned resources is still unoccupied because no other UE is transmitting using the resources. UE 102a therefore begins sending its uplink transmission to the base station 100.

As is clear from the description above with respect to FIG. 6, the frame configuration module 120 may allocate a partition of free assigned resources to multiple UEs and prioritize UEs by assigning each UE a respective backoff duration. The larger the backoff duration assigned to a UE, the lower the transmission priority of that UE. UEs allocated to the partition of free assigned resources then wait their respective assigned backoff duration before transmitting, and only transmit if another transmission by another UE, using the partition of free assigned resources, is not occurring. If there still happens to be a collision, then the collision may be detected by the UEs or by the base station 100, and the affected UEs may attempt to retransmit their data in a later uplink frame. The medium sensing method used by the UEs allocated to the free assigned resources may be referred to deterministic backoff, because the backoff duration for each UE is determined by the base station 100.

In another embodiment, a group of UEs is assigned a partition of random access resources in an uplink frame. Each member of the group of UEs chooses a random backoff duration. Each UE that has data to transmit uses medium sensing to monitor the partition of random access resources to determine whether another member of the group of UEs is transmitting using the resources. If another UE is transmitting using the resources, then the monitoring UE does not transmit using the resources. However, if upon completion of the random backoff duration selected by the monitoring UE, another UE still has not begun transmitting using the partition of random access resources, then the monitoring UE sends its uplink transmission using the partition of random access resources. The partition of random access resources may begin at the start of a time slot, in which case the medium sensing begins at the start of that time slot and ends upon completion of the random backoff duration. The completion of the random backoff duration may occur at an instance in time after the beginning of the time slot, but before the end of that time slot.

As an example, in every uplink frame the frame configuration module 120 may allocate a portion of random access resources to both UE 102*d* and UE 102*f*, so that UE 102*d* and UE 102*f* may transmit data to the base station 100 without having to first request uplink resources. The frame control message 124 indicates to UE 102*f* and UE 102*d* which partition of random access resources has been allocated to UE 102*d* and UE 102*f*. In this example, UE 102*d* and UE 102*f* both have data to be transmitted to the base station 100. UE 102*d* and UE 102*f* respectively choose random backoff durations, $T_d$ and $T_f$. UE 102*d* and UE 102*f* then both monitor the allocated partition of random access resources to determine whether another UE is sending an uplink transmission using the partition of random access resources. UE 102*d* monitors the allocated partition until completion of backoff duration $T_d$, and if at that time the partition of random access resources is still unoccupied, then UE 102*d* begins transmitting its data using the partition of random access resources. If any time before the completion of backoff duration $T_d$, UE 102*d* determines that another UE is sending an uplink transmission using the partition of random access resources, then UE 102*d* waits until a later uplink frame to again attempt to transmit the data. Similarly, UE 102*f* monitors the allocated partition until completion of backoff duration $T_f$, and only transmits if the partition of random access resources is still unoccupied upon completion of backoff duration $T_f$. The random backoff durations $T_d$ and $T_f$ determine the priority. If $T_f < T_d$, then UE 102*f* has transmission priority over UE 102*d*. If $T_d < T_f$, then UE 102*d* has transmission priority over UE 102*f*. The medium sensing performed may be referred to as random backoff because UE 102*d* and UE 102*f* each back off for a random time duration, rather than for a time duration determined and assigned by the base station 100. If there happens to be a collision, then the collision may be detected by the transmitting UEs or by the base station 100, and the affected UEs may attempt to retransmit their data in a later uplink frame.

Figure 7:
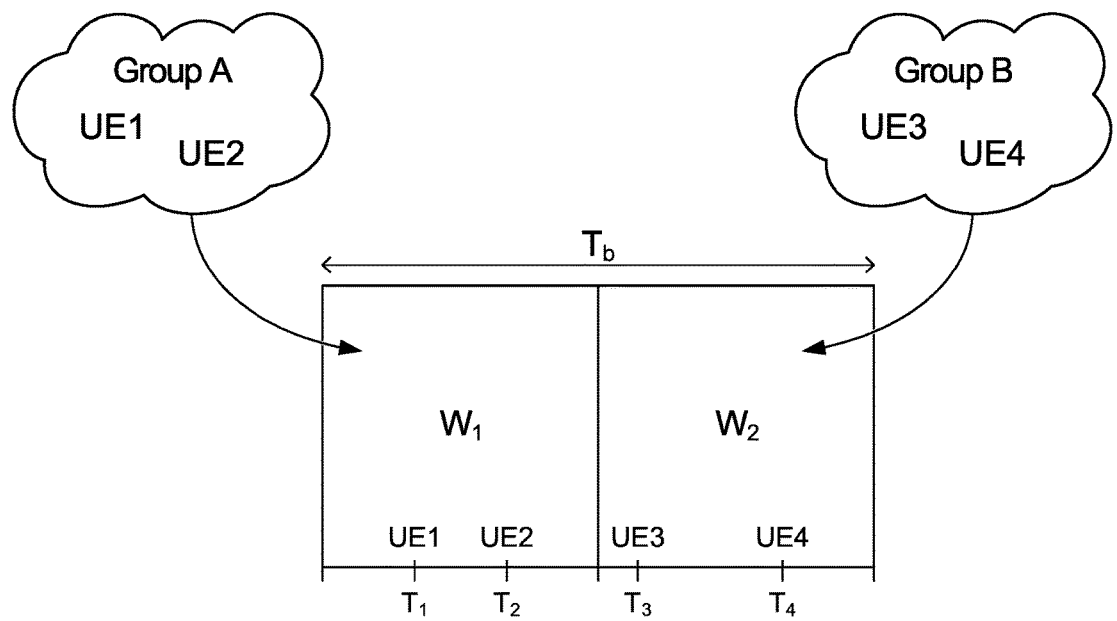
FIG. 7 illustrates an example backoff period.

In some embodiments, the base station 100 may allocate a partition of random access resources to multiple groups of UEs and prioritize each group of UEs by assigning different groups of UEs different backoff windows. For example, FIG. 7 illustrates a backoff period $T_b$. Within the backoff period $T_b$, there are two windows $W_1$ and $W_2$. A first group of UEs ("Group A") are assigned to window $W_1$ by the frame control message 124. A second group of UEs ("Group B") are assigned to window $W_2$ by the frame control message. The Group A UEs each select random backoff durations that end within window $W_1$. The Group B UEs each select random backoff durations that end within window $W_2$. For example, as illustrated in FIG. 7, UE 1 has randomly selected backoff duration $T_1$, UE 2 has randomly selected backoff duration $T_2$, UE 3 has randomly selected backoff duration $T_3$, and UE 4 has randomly selected backoff duration $T_4$. UEs 1 and 2 are in Group A, and therefore randomly selected backoff durations $T_1$ and $T_2$ are limited to ending within window $W_1$. UEs 3 and 4 are in Group B, and therefore randomly selected backoff duration $T_3$ and $T_4$ are limited to being within window $W_2$. In this example, each one of UEs 1 to 4 have data to transmit. Therefore, each one of UEs 1 to 4 monitors the partition of random access resources, and only transmits upon completion of their respective backoff duration if another UE has not already begun transmitting using the partition of random access resources. Because window $W_1$ is earlier in time than window $W_2$, the Group A UEs have transmission priority over the Group B UEs. However, each UE within Group A has random transmission priority over the other UEs in Group A, and each UE within Group B has random priority over the other UEs in Group B. In some embodiments, window $W_1$ may partially overlap in time with window $W_2$.

When a UE is using medium sensing for monitoring, the medium sensing may occur on an ongoing basis. Alternatively, the UE may only perform the medium sensing once, upon completion of the UE's backoff duration, to determine whether or not the partition of resources is already being used by another UE.

In some embodiments, the frame control message 124 transmitted by the base station 100, for an uplink frame, has the following unified signaling format for each UE: $[U_i\text{-}T_i\text{-}W_i\text{-}RP_i]$. "$U_i$" identifies the UE. "$T_i$" specifies a backoff duration that the UE must wait before the UE can attempt to send an uplink transmission. "$W_i$" specifies a window value. If $W_i$ is non-zero, then the UE chooses a random value $rv_i$ less than or equal to $W_i$. The UE then further extend the backoff duration $T_i$ by an extra duration of $rv_i$. "$RP_i$" is the partition of resources that the UE uses to send an uplink transmission. Each UE is assigned a respective set of parameters $U_i$, $T_i$, $W_i$, and $RP_i$. If the UE is capable of medium sensing, the UE performs medium sensing to monitor $RP_i$ and only transmits upon completion of the backoff duration if $RP_i$ is not already being used by another UE.

Referring back to FIGS. 1 and 2, the unified signaling format may work as follows for a particular uplink frame. When the frame configuration module 120 allocates a dedicated partition of demand assigned resources to UE 102*b*, then the signaling for UE 102*b* in the frame control message 124 may be $[U_i\text{-}T_i\text{-}W_i\text{-}RP_i]=[UE_{102b}\text{-}0\text{-}0\text{-}RP_D]$. $UE_{102b}$ is the identifier of UE 102*b*. $T_i=W_i=0$, which informs UE 102*b* that the backoff duration is zero. UE 102*b* may therefore begin sending the uplink transmission without first backing off. $RP_D$ is the partition of demand assigned resources that have been allocated to UE 102*b* by the frame configuration module 120. The partition of demand assigned resources $RP_D$ is not allocated to any others of UEs 102*a-f*. The backoff duration that UE 102*b* has to wait before making the uplink transmission is zero, i.e. $T_i=W_i=0$, because resources $RP_D$ are dedicated to UE 102*b*.

When the frame configuration module 120 allocates a partition of free assigned resources to both UE 102*a* and UE 102*c*, and when UE 102*c* has priority over UE 102*a*, then: the signaling for UE 102*c* in the frame control message 124 may be $[U_i\text{-}T_i\text{-}W_i\text{-}RP_i]=[UE_{102c}\text{-}T_1\text{-}0\text{-}RP_F]$, and the signaling for UE 102*a* in the frame control message 124 may be $[U_i\text{-}T_i\text{-}W_i\text{-}RP_i]=[UE_{102a}\text{-}T_2\text{-}0\text{-}RP_F]$. Both UE 102*c* and UE 102*a* are allocated the same partition of free assigned resources $RP_F$. However, UE 102*c* must back off for duration $T_1$. If UE 102*c* has medium sensing, then UE 102*c* can only transmit if, upon completion of backoff duration $T_1$, no other UE has already begun transmitting using the resources. UE 102*a* must back off for duration $T_2$. If UE 102*a* has medium sensing, then UE 102*a* can only transmit using the resources if, upon completion of backoff duration $T_2$, no other UE has already begun transmitting using the resources. Backoff duration $T_2$ is greater than backoff duration $T_1$ because UE 102*c* has transmission priority over UE 102*a*. $T_1$ may be zero if UE 102*c* has priority over any other UEs allocated the partition of free assigned resources. In some embodiments, if only one UE is allocated a partition free assigned resources, e.g. because the UEs do not have medium sensing capability, then the signaling for the UE in the frame control message 124 would be similar to if a demand assigned resource was being granted to the UE: [UE-0-0-RP]. However, the "RP" field would allocate a resource partition that the base station identified as a free assigned resource. The "RP" field would not allocate a resource partition that the base station identified as a demand assigned resource because the UE did not request the granted resource.

When the frame configuration module 120 allocates a partition of random access resources to both UE 102*d* and UE 102*f*, then the signaling for UE 102*d* in the frame control message 124 may be $[U_i\text{-}T_i\text{-}W_i\text{-}RP_i]=[UE_{102d}\text{-}0\text{-}W_1\text{-}RP_{RA}]$, and the signaling for UE 102*f* in the frame control message 124 may be $[U_i\text{-}T_i\text{-}W_i\text{-}RP_i]=[UE_{102f}\text{-}0\text{-}W_2\text{-}RP_{RA}]$. $W_1$ may or may not be equal to $W_2$. Both UE 102*d* and UE 102*f* are allocated the same partition of random access resources $RP_{RA}$. However, UE 102*d* must choose a random backoff duration between $T_1=0$ and $W_1$, and back off for the random backoff duration selected before possibly being able to send an uplink transmission. For example, if UE 102*d* randomly selects backoff duration $T_1$, where $0 \le T_1 \le W_1$, then UE 102*d* may not attempt to transmit until completion of the backoff duration $T_1$. If UE 102*d* has medium sensing, then UE 102*d* may only transmit using the resources if during the backoff duration $T_1$ no other UE has already begun transmitting using the resources. Similarly, UE 102*f* must choose a random backoff duration between $T_1=0$ and $W_2$, and back off for the random backoff duration selected before possibly being able to send an uplink transmission. If UE 102*f* randomly selects $T_2$, where $0 \le T_2 \le W_2$, then UE 102*f* may not attempt to transmit until completion of the backoff duration $T_2$. If UE 102*f* has medium sensing, then UE 102*f* may only transmit using the resources if during the backoff duration $T_2$ no other UE has already begun transmitting using the resources.

When the frame configuration module 120 allocates a partition of random access resources to both UE 102*d* and UE 102*f*, and when UE 102*d* is part of a first group of UEs, and when UE 102*f* is part of a second group of UEs, and when the first group of UEs has a higher transmission priority than the second group of UEs, then: the signaling for UE 102*d* in the frame control message 124 may be $[U_i\text{-}T_i\text{-}W_i\text{-}RP_i]=[UE_{102d}\text{-}T_A\text{-}W_1\text{-}RP_{RA}]$, and the signaling for UE 102*f* in the frame control message 124 may be $[U_i\text{-}T_i\text{-}W_i\text{-}RP_i]=[UE_{102f}\text{-}T_B\text{-}W_2\text{-}RP_{RA}]$. $T_A < T_B$, and $W_1$ may or may not be equal to $W_2$. Both UE 102*d* and UE 102*f* are allocated the same partition of random access resources $RP_{RA}$. However, UE 102*d* must choose a random value $rv_a$ between 0 and $W_1$, and then wait for a backoff duration of $T_A+rv_a$ before being able to possibly send an uplink transmission. UE 102*f* must choose a random value $rv_b$ between 0 and $W_2$, and then wait for a backoff duration of $T_B+rv_b$ before possibly being able to send an uplink transmission. Because $T_A$ is less than $T_B$, the first group of UEs will have transmission priority over the second group of UEs. Therefore, UE 102*d* will have transmission priority over UE 102*f*.

As is clear from the examples above, the unified signaling format $[U_i\text{-}T_i\text{-}W_i\text{-}RP_i]$ may be used for each UE in a frame control message 124, regardless of whether the UE is allocated demand assigned, free assigned, or random access resources, regardless of whether the resources allocated to the UE are dedicated or shared, regardless of the transmission priority of the UE, and even regardless of whether the UE is or is not capable of performing medium sensing. If a particular UE is not capable of performing medium sensing, then the UE may transmit upon completion of the backoff duration without first monitoring to see if there is already another transmission ongoing that is using the same resources.

In some embodiments, the frame control message 124 is also used to inform UEs 102*a-f* of the duration and/or properties of each uplink frame. As one example, the following information may be transmitted to UEs 102*a-f* in the frame control message 124, as necessary:

(1) The configuration time span: This is the duration of time for which the frame configuration applies. If each uplink frame has a different resource allocation, then the configuration time span is equal to the time duration of each uplink frame, e.g., $T_F$ in FIG. 3. The configuration time span value may be static or semi-static. If the value is static, the value may only need to be transmitted once to each of UEs 102*a-f*. If the value is semi-static or dynamic, then the value is transmitted to each of UEs 102*a-f* whenever the value is changed by the frame configuration module 120.

(2) One of the following to indicate the duration of each of the demand assigned, free assigned, and random access resource partitions:

(a) An identification of the number of time slots of each one of the demand assigned, free assigned, and random access resource partitions.

(b) An index for each one of the demand assigned, free assigned, and random access resource partitions. Each index corresponds to a respective pre-defined time duration.

(c) An identification of the duration of each one of the demand assigned, free assigned, and random access resource partitions measured in terms of number of symbols or atomic time units.

(3) The ID of each UE, e.g. a user flow ID in the form of a radio network temporary identifier (RNTI).

(4) The absolute or symbol-aligned/atomic-slot-aligned time instant marking the beginning of the time window within which a UE will or may transmit during the demand assigned, free assigned, or random access time slot; or the duration of a time window within which the UE will or may transmit expressed in number of symbols or atomic slots.

Some of the information in (1) to (4) above may be transmitted from the base station 100 on a periodic basis, e.g., if the frame structure or frame configuration only changes on a semi-static basis. Some of the information in (1) to (4) above may be transmitted when an event occurs that triggers a change in the frame configuration. Three example events are as follows:

(A) The frame configuration module 120 determines, from monitoring the uplink transmissions of UE 102*c*, that UE 102*c* sends an uplink transmission approximately once every ten seconds. The frame configuration module 120 may then update the frame configuration to allocate UE 102*c* free assigned resources every ten seconds. The frame configuration module 120 may subsequently determine that UE 102*c* is instead now sending an uplink transmission approximately every five seconds. The frame configuration module 120 may then update the frame configuration to allocate UE 102*c* free assigned resources every five seconds. In this way, variable time span configurations may be supported. The change in how often UE 102*c* is sending an uplink transmission is an event that triggers a change in the frame configuration.

(B) The base station 100 may be coordinated with neighboring base stations (not illustrated). There may be handover of UEs to/from the neighboring base stations, and the base station 100 may be configured to coordinate its uplink frame with an uplink frame of a neighboring base station. The frame configuration module 120 may reconfigure an uplink frame in order to try to mitigate interference with uplink transmissions to neighboring base stations.

(C) An additional UE begins being served by the base station 100, e.g. because the UE has just joined the network or because the UE has just been handed over from a neighboring base station. The frame configuration module 120 may reconfigure an uplink frame in order to accommodate the needs of the additional UE. Similarly, the frame configuration module 120 may reconfigure an uplink frame when a UE being served by the base station 100 leaves the network or is handed over to a neighboring base station.

Figure 8:
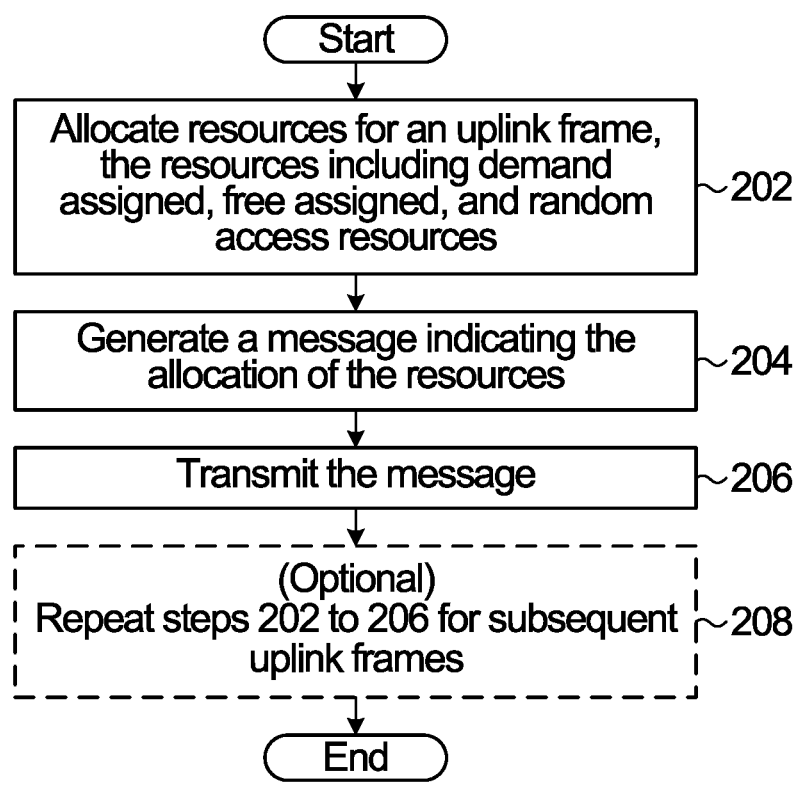
FIG. 8 is a flowchart of a method performed by a base station, according to one embodiment.

FIG. 8 is a method performed by base station 100, according to one embodiment. In step 202, the frame configuration module 120 allocates resources for a first uplink frame. In this step, a first partition of resources of the uplink frame are allocated as demand assigned resources, a second partition of resources of the uplink frame are allocated as free assigned resources, and a third partition of resources of the uplink frame as allocated as random access resources. The demand assigned resources are allocated to a first UE in response to a request for uplink resources from the first UE. The first UE may have requested uplink resources in a previous demand assignment phase. As an example, the first UE may be UE 102b from FIG. 1, and the demand assigned resources allocated to UE 102b may be the resources illustrated in time slot 1 of uplink frame 160 in FIG. 4. The free assigned resources are allocated to a second UE, but not in response to a request for uplink resources. As an example, the second UE may be UE 102c, and the frame configuration module 120 allocates the free assigned resources to UE 102c because the frame configuration module 120 knows from a rule stored in memory 122 that UE 102c will need to send an uplink transmission of data. The random access resources are allocated for shared use by both a third UE and a fourth UE, for random access uplink communication. As an example, the third UE and the fourth UE may be UEs 102d and 102f, and the frame configuration module 120 may allocate the random access resources to UEs 102d and 102f so that UEs 102d and 102f may transmit any bursty traffic that may have arrived at UEs 102d and 102f. In some embodiments, the random access uplink communication requires the third UE and the fourth UE to wait a respective backoff duration before being able to send an uplink transmission using the random access resources. The backoff duration the third UE waits is randomized by the third UE, and the backoff duration the fourth UE waits is randomized by the fourth UE. In some embodiments, the random access resources are only allocated to a subset of all of the UEs served by the base station 100.

Although the first UE, second UE, third UE, and fourth UE are described as being distinct devices, it is contemplated that a single UE may be allocated two different types of resources in the same frame, for example demand assigned resources and free assigned resources.

In step 204, the frame configuration module 120 generates at least one message indicating the allocation of resources for the first uplink frame. The at least one message may be generated by the frame configuration module 120 by collecting the information determined in step 202, and inserting the information into the at least one message. In step 206, the base station 100 then transmits the at least one message indicating the allocation of resources for the first uplink frame. Optionally, in step 208, the base station 100 repeats steps 202 to 206 for subsequent uplink frames.

In some embodiments, if step 208 is performed, then the base station 100 may later transmit another message allocating resources of a subsequent uplink frame. The demand assigned resources, free assigned resources, and/or the random access resources allocated in the subsequent uplink frame may be in a location that is different from the location of the respective resources in the first uplink frame. An example is discussed earlier in relation to FIG. 5.

In some embodiments, the free assigned resources of the first uplink frame may also be allocated to a fifth UE, such that the second UE and the fifth UE share the free assigned resources. A message transmitted in step 206 may indicate to the second UE a first backoff duration the second UE must wait before being able to send an uplink transmission using the free assigned resources. The message may also indicate to the fifth UE a second backoff duration the fifth UE must wait before being able to send an uplink transmission using the free assigned resources. The first and second backoff durations may be different to prioritize one UE over another.

In some embodiments, a message transmitted in step 206 may indicate to each of the third UE and the fourth UE: (1) a respective minimum backoff duration the third UE and the fourth UE must wait before being able to send an uplink transmission using the random access resources; and (2) a respective window value for use by the third UE and the fourth UE to randomly extend the respective minimum backoff duration. The respective minimum backoff durations may be the same or different for the third and fourth UEs. The respective window values may be the same or different for the third and fourth UEs.

In some embodiments, subsequent to step 206 the base station 100 does not receive an uplink transmission from the second UE using the free assigned resources. The free assigned resources are allocated to the second UE for possible use by the second UE, but the second UE may not have data to transmit. Therefore, the free assigned resources may optionally be allocated to other UEs also, e.g., as in the example described with respect to FIG. 6.

In some embodiments, at step 208 a different resource allocation is used for a subsequent frame, for example based on the needs and capabilities of the UEs being served by the base station. The resource allocation may change every frame or less often. For example, the second UE may be allocated free assigned resources in the first uplink frame, but not in a subsequent uplink frame. No resources at all may be allocated to the second UE in the subsequent uplink frame if the periodic time at which the second UE is to send an uplink transmission has passed. As another example, the first UE may use the demand assigned resources allocated in the first uplink frame to transmit the data from the first UE to the base station 100. However, the first UE may still be allocated free assigned or random assigned resources in a subsequent uplink frame, without the first UE making a request for uplink resources, just in case the first UE subsequently has bursty data to transmit.

In some embodiments, resource partitions may be allocated to UE traffic flows, rather than particular UEs. For example, in step 202 the frame configuration module 120 may allocate the demand assigned resources to a first UE traffic flow in response to a request for uplink resources from a UE having the first UE traffic flow and wanting to send packets of the first UE traffic flow to the base station 100. The UE having the first UE traffic flow may have requested uplink resources in a previous demand assignment phase. The free assigned resources may be allocated to a second UE traffic flow, but not in response to a request for uplink resources from the UE having the second UE traffic flow. The random access resources may be allocated for shared use by both a third UE traffic flow and a fourth UE traffic flow, for random access uplink communication. The random access uplink communication may require the UE having the third UE traffic flow to wait a backoff duration that is randomized by the UE having the third UE traffic flow, before being able to send an uplink transmission for the third UE traffic flow using the random access resources. The random access uplink communication may also require the UE having the fourth UE traffic flow to wait another backoff duration that is randomized by the UE having the fourth UE traffic flow, before being able to send an uplink transmission for the fourth UE traffic flow using the random access resources.

The different UE traffic flows may or may not be from the same UE. The demand assigned resources, free assigned resources, and/or the random access resources allocated in a subsequent uplink frame may be in a location that is different from the location of the respective resources in the first uplink frame.

In some embodiments, the free assigned resources are also allocated to a fifth UE traffic flow such that the second UE traffic flow and the fifth UE traffic flow share the free assigned resources. A message transmitted in step 206 may indicate a first backoff duration a UE having the second UE traffic flow must wait before being able to send an uplink transmission for the second UE traffic flow using the free assigned resources. The message may further indicate a second backoff duration a UE having the fifth traffic flow must wait before being able to send an uplink transmission for the fifth UE traffic flow using the free assigned resources.

In some embodiments, a message transmitted in step 206 may indicate a minimum backoff duration a UE having the third UE traffic flow must wait before being able to send an uplink transmission for the third UE traffic flow using the random access resources. The message may also indicate a minimum backoff duration a UE having the fourth UE traffic flow must wait before being able to send an uplink transmission for the fourth UE traffic flow using the random access resources. The message may also indicate a window value for use by the UE having the third UE traffic flow to randomly extend the minimum backoff duration the UE having the third UE traffic flow must wait before being able to send an uplink transmission for the third UE traffic flow using the random access resources. The message may also indicate a window value for use by the UE having the fourth UE traffic flow to randomly extend the minimum backoff duration the UE having the fourth UE traffic flow must wait before being able to send an uplink transmission for the fourth UE traffic flow using the random access resources.

Figure 9:
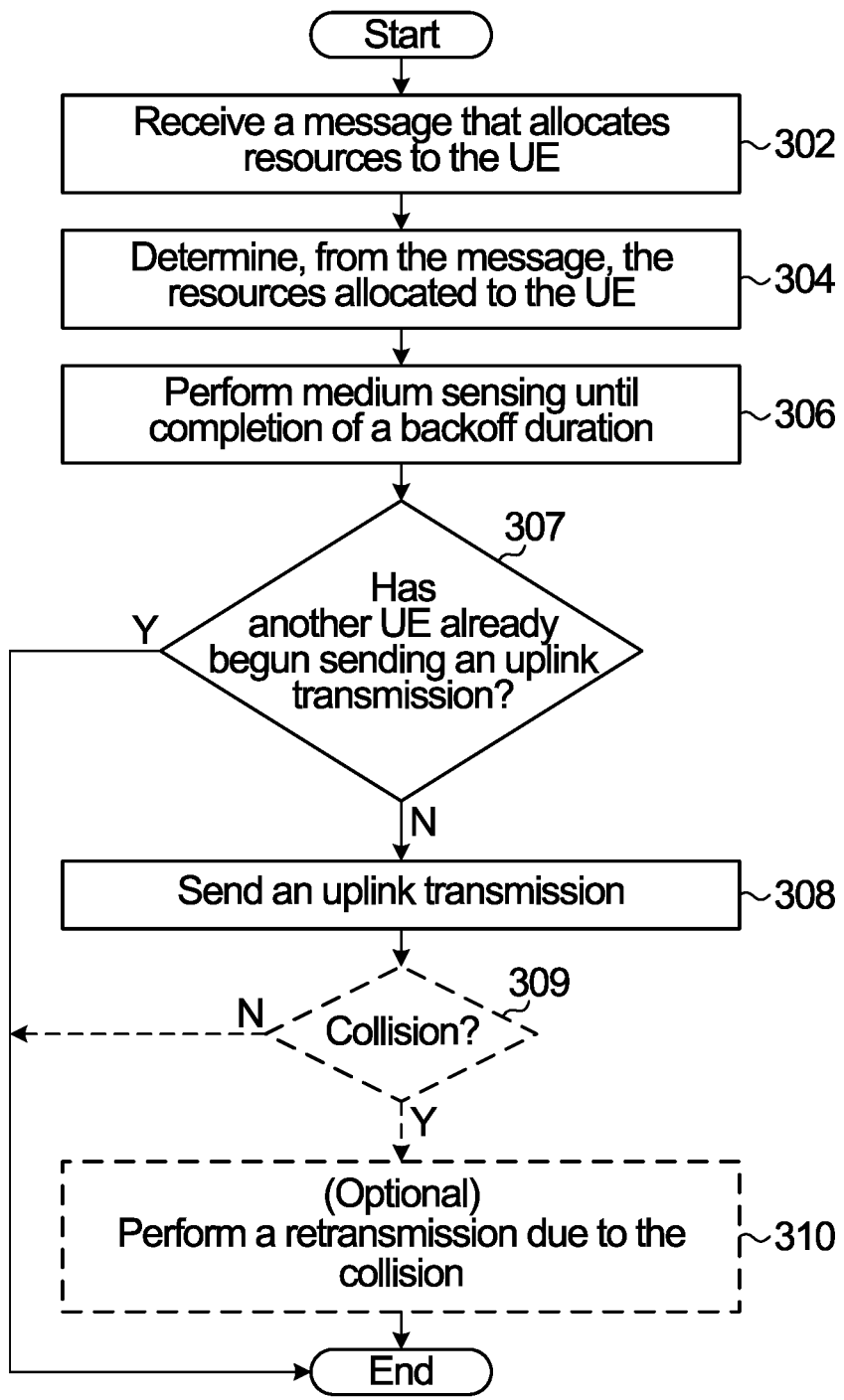
FIG. 9 is a flowchart of a method performed by a UE, according to one embodiment.

In some embodiments, subsequent to step 206 the base station 100 does not receive an uplink transmission from the second UE traffic flow using the free assigned resources. The free assigned resources are allocated to the second UE traffic flow for possible use by the UE having the second UE traffic flow to transmit packets of the second UE traffic flow to the base station 100. However, there may not be any data packet from the second UE traffic flow to transmit. Therefore, the free assigned resources may optionally be allocated to other UE traffic flows also. FIG. 9 is a method performed by a UE 102, according to one embodiment. In step 302, UE 102 receives at least one message from the base station 100. The message allocates resources in an uplink frame to the UE. In step 304, the resource determination module 134 of the UE 102 determines, from the message, the resources allocated to the UE. The resource determination module 134 may perform step 304 by removing from the message the information in the message that allocates the resources. For example, if the message has the format $[U_i\text{-}T_iW_i\text{-}RP_i]$ described earlier, the resource determination module 134 extracts the field "$RP_i$" from the message.

In step 306, the LBT module 132 of the UE 102 performs medium sensing during a backoff duration to determine whether, any time during the backoff duration, another UE begins sending an uplink transmission using the allocated resources. The medium sensing performed by the LBT module 132 comprises monitoring the wireless channel, at the frequencies of the allocated resources, to listen for another transmission on the frequencies. The monitoring may use a receive antenna of the UE 102. In some embodiments, the allocated resources begin, in the time domain, at the start of a time slot of the uplink frame. The medium sensing begins at the start of that time slot, and continues until the completion of the backoff duration. In some embodiments, the medium sensing is carrier sensing. In other embodiments, the medium sensing is based on energy detection.

In some embodiments, the backoff duration is determined by the UE from the message received in step 302. For example, in step 304 the resource determination module 134 may extract the backoff duration value from the message. If the message has the format $[U_i\text{-}T_iW_i\text{-}RP_i]$ described earlier, the resource determination module 134 may extract the fields "$T_i$" and "$W_i$" from the message to determine the backoff duration. In some embodiments, the message received in step 302 specifies an initial backoff duration $T_i$, and the UE 102 increases the initial backoff duration $T_i$ by a random value to obtain the backoff duration. In some embodiments, the random value is obtained by the UE 102 randomly generating a value that is less than a window value $W_i$ included in the at message received in step 302. The random value may be generated by a random number generator (not illustrated) at the UE 102.

In step 307, the UE 102 determines whether another UE has already begun sending an uplink transmission. If not, then upon completion of the backoff duration, at step 308 the UE 102 sends an uplink transmission using the allocated resources. The uplink transmission may include control information and/or data. The control information and/or data may be part of a traffic flow. Optionally, in step 309, the UE 102 determines whether a collision occurs between the uplink transmission sent by the UE 102 in step 308 and a transmission from another device. If a collision occurs, then the UE 102 performs a retransmission in a subsequent uplink frame. The collision may be detected by the UE 102 or by the base station 100, depending upon the capabilities of the UE 102.

In some embodiments, the UE 102 does not send a request to the base station 100 for the resources that are allocated to the UE 102 in the message received in step 302. In some embodiments, the uplink frame mentioned in step 302 is a first uplink frame, and the UE 102 is not allocated any resources in a subsequent uplink frame.

The following benefits may be realized by some embodiments described herein. A scalable frame structure may be provided that is adaptable to different applications because the frame structure may be configured on a dynamic or semi-static basis to accommodate different UEs with different traffic characteristics or latency requirements. Improved performance may be realized in terms of throughput, delay, and collisions, e.g. by allocating a set of free assigned or random access resources to multiple UEs and indicating transmission priority that is enforced via medium sensing. A simple multi-access protocol may be provided that is uniform for different types of UEs and communication systems. The availability of demand assigned, free assigned, and random access resources in an uplink frame may allow for periodic allocation to support real-time and stream-type traffic, faster connection for bursty traffic and/or delay-sensitive traffic, and medium sensing for lower/controllable collision probability and easier collision resolution. A demand assignment phase may introduce unwanted overhead or delay for UEs executing applications that have bursty traffic, or that require fast response, or that require fast sleep/wake-up. A UE may therefore be allocated free assigned or random access resources to avoid the delay incurred by a demand assignment phase. The carrier sense multiple access (CSMA)-like methods described herein my enhance performance compared to having no medium sensing. The frame structure may be considered universal and scalable in that a different number of UEs having different traffic characteristics and different latency requirements may be accommodated by allocating and scheduling demand assigned, free assigned, and random access resources, as necessary. The free assigned access and random access may be enhanced by assigning transmission priority and using the medium sensing. Embodiments described herein may be adopted in OFDMA and/or TDMA systems, whether or not the wireless communication system is synchronous or asynchronous. Embodiments described herein may be applied to LTE TDD with UEs having medium sensing for enhanced system performance and more robust operation. Embodiments described herein may be applied to LTE in unlicensed spectrum (LTE-U) systems or License Assisted Access (LAA) systems. A unified channel access uplink frame structure may be provided to support both LTE and Wi-Fi, for better co-existence and higher spectral efficiency, e.g., in dense heterogeneous networks ("hetnets") to support virtualized wireless networks for better slice isolation.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a base station, the method comprising:
    transmitting at least one message allocating resources of an uplink frame, the at least one message allocating:
        a first partition of the resources of the uplink frame as demand assigned resources, the demand assigned resources allocated to a first user equipment (UE) in response to a request for uplink resources;
        a second partition of the resources of the uplink frame as free assigned resources, the free assigned resources allocated to a second UE, not in response to a request for uplink resources;
        a third partition of the resources of the uplink frame as random access resources, the random access resources allocated for shared use by a third UE and a fourth UE, for random access uplink communication.

2. The method of claim 1, wherein the uplink frame is a first uplink frame, and the method further comprises transmitting at least one other message allocating resources of a subsequent uplink frame, the at least one other message allocating at least one of:
    demand assigned resources at a location in the subsequent uplink frame different from the location of the demand assigned resources in the first uplink frame;
    free assigned resources at a location in the subsequent uplink frame different from the location of the free assigned resources in the first uplink frame; and
    random access resources at a location in the subsequent uplink frame different from the location of the random access resources in the first uplink frame.

3. The method of claim 1, wherein:
    the at least one message further:
    allocates the free assigned resources to a fifth UE such that the second UE and the fifth UE share the free assigned resources;
    indicates to the second UE a first backoff duration the second UE must wait before being able to send an uplink transmission using the free assigned resources; and
    indicates to the fifth UE a second backoff duration the fifth UE must wait before being able to send an uplink transmission using the free assigned resources.

4. The method of claim 1, wherein the at least one message also indicates to each of the third UE and the fourth UE:
    a respective minimum backoff duration the third UE and the fourth UE must wait before being able to send an uplink transmission using the random access resources; and a respective window value for use by the third UE and the fourth UE to randomly extend the respective minimum backoff duration.

5. The method of claim 1, wherein the random access uplink communication requires the third UE and the fourth UE to wait a respective backoff duration before being able to send an uplink transmission using the random access resources, and wherein the backoff duration the third UE must wait is randomized by the third UE, and wherein the backoff duration the fourth UE must wait is randomized by the fourth UE.

6. The method of claim 1, wherein the uplink frame is a first uplink frame, wherein the at least one message is a first message, and wherein the method further comprises:
transmitting a second message allocating resources of a subsequent uplink frame, the second message not allocating resources of the subsequent uplink frame to the second UE.

7. The method of claim 1, wherein the first UE and third UE are the same UE.

8. A base station comprising:
a frame configuration module to generate at least one message allocating resources of an uplink frame, the at least one message allocating:
a first partition of the resources of the uplink frame as demand assigned resources, the demand assigned resources allocated to a first user equipment (UE) in response to a request for uplink resources;
a second partition of the resources of the uplink frame as free assigned resources, the free assigned resources allocated to a second UE, not in response to a request for uplink resources;
a third partition of the resources of the uplink frame as random access resources, the random access resources allocated for shared use by a third UE and a fourth UE, for random access uplink communication;
and at least one antenna to transmit the at least one message.

9. The base station of claim 8, wherein the uplink frame is a first uplink frame, and wherein the frame configuration module is further configured to generate at least one other message allocating resources of a subsequent uplink frame, the at least one other message allocating:
demand assigned resources at a location in the subsequent uplink frame different from the location of the demand assigned resources in the first uplink frame;
free assigned resources at a location in the subsequent uplink frame different from the location of the free assigned resources in the first uplink frame; and
random access resources at a location in the subsequent uplink frame different from the location of the random access resources in the first uplink frame.

10. The base station of claim 8, wherein the at least one message further:
allocates the free assigned resources to a fifth UE such that the second UE and the fifth UE share the free assigned resources;
indicates to the second UE a first backoff duration the second UE must wait before being able to send an uplink transmission using the free assigned resources; and
indicates to the fifth UE a second backoff duration the fifth UE must wait before being able to send an uplink transmission using the free assigned resources.

11. The base station of claim 8, wherein the at least one message also indicates to each of the third UE and the fourth UE:
a respective minimum backoff duration the third UE and the fourth UE must wait before being able to send an uplink transmission using the random access resources; and
a respective window value for use by the third UE and the fourth UE to randomly extend the respective minimum backoff duration.

12. The base station of claim 8, wherein the random access uplink communication requires the third UE and the fourth UE to wait a respective backoff duration before being able to send an uplink transmission using the random access resources, and wherein the backoff duration the third UE must wait is randomized by the third UE, and wherein the backoff duration the fourth UE must wait is randomized by the fourth UE.

13. The base station of claim 8, wherein the uplink frame is a first uplink frame, wherein the at least one message is a first message, and wherein the frame configuration module is further configured to:
generate a second message allocating resources of a subsequent uplink frame, the second message not allocating resources of the subsequent uplink frame to the second UE.

14. The base station of claim 8, wherein the first UE and the third UE are the same UE.

* * * * *